(12) United States Patent  
Lin

(10) Patent No.: US 6,568,804 B1  
(45) Date of Patent: May 27, 2003

(54) DECORATIVE FIXING SEAT ON SPECTACLES

(76) Inventor: Ta-Sen Lin, 4f, No.22, Lane 20, Chuan Chou St., Taipei (TW)

( * ) Notice: Subject to any disclaimer, the term of this patent is extended or adjusted under 35 U.S.C. 154(b) by 0 days.

(21) Appl. No.: 10/118,996

(22) Filed: Apr. 10, 2002

(51) Int. Cl.[7] .............................................. G02C 11/02
(52) U.S. Cl. ........................................ 351/52; 351/158
(58) Field of Search .............................. 351/51, 52, 158

(56) References Cited

U.S. PATENT DOCUMENTS 5,497,211 A * 3/1996 McNulty ..................... 351/52

* cited by examiner

*Primary Examiner*—Huy Mai  
(74) *Attorney, Agent, or Firm*—Bacon & Thomas, PLLC

(57) ABSTRACT

A decorative fixing seat on a pair of spectacles, the fixing seat is made of tenacious plastic, and has a clamping slit longitudinally extending therein and having an opening facing downwards, two engaging portions are provided on the two sides of an opening of the clamping slit; the fixing seat is adapted to being fixed thereon with a pattern or a letter ornament, and is adapted to clamping on the frame or the temples of the spectacles taking advantage of clamping of the engaging portions provided on the lateral sides of the opening of the clamping slit. The fixing seat can allow a user to change the modeling of the ornament by himself, and can be fixedly mounted thereon with an upright rod to fixedly mount a pattern or a letter ornament etc.; this can increase the changeability of it in use, and the effect of usage of the spectacles can be made outstanding.

4 Claims, 4 Drawing Sheets

DECORATIVE FIXING SEAT ON SPECTACLES

BACKGROUND OF THE INVENTION

1. Field of the Invention

The present invention is related to a decorative fixing seat on a pair of spectacles, and especially to such a decorative seat made of tenacious plastic for fixing on a pair of spectacles by a user, in order that the user can put a pattern or a letter, an advertisement figure or word or beads and a chain etc. on the seat to get a modeling of the spectacles or an object of advertisement.

2. Description of the Prior Art

Generally, in joining a Christmas festival, a Halloween activity, a make-up ball or various activities, people tend to get graceful bearings by having various splendid designing of modeling to make themselves outstanding, the outstanding costumes and accessories also play very important roles.

By virtue that the accessories for use in the abovementioned activities are numerous, and spectacles used normally can give the feelings of mystery, modernization or comedy etc. by various modeling of the accessories, hence the accessories are deeply delighted with. The numerous modeling of spectacles available presently is given shapes during manufacturing; thereby, consumers can only select the desired fashions among the spectacles already given modeling.

However, the spectacles are given modeling during manufacturing, once their modeling does not meet the fondness of the markets and the consumers, it results a trouble for the manufacturers and sellers, dealing of spectacles which are difficult to sell is even more trouble. And more, on the standpoint of consumers, the consumers need a plenty of time to find and select their desired and suitable spectacles; and by virtue that the modeling of the spectacles is unable to change, the consumers must find other spectacles meeting the required modeling again, this is quite cumbersome.

SUMMARY OF THE INVENTION

In view of this, the inventor of the present invention provides a decorative fixing seat on a pair of spectacles based on his professional experience of years in designing and manufacturing same kind of products and after nonstop study, developing as well as improvements. Thereby, the problems having existed long in the manufacturing field and the selling field of spectacles about the defects of the conventional accessories for spectacles can be surely gotten rid of.

The primary object of the present invention is to provided a decorative fixing seat on a pair of spectacles, which fixing seat is made of tenacious plastic; the fixing seat has a clamping slit longitudinally extending therein and having an opening facing downwards, two engaging portions are provided on the two sides of the opening of the clamping slit. The fixing seat can be mounted thereon with a pattern or a letter, an advertisement figure etc., and can be mounted on the frame of a pair of spectacles taking advantage of clamping of the engaging portions provided on the two sides of the opening of the clamping slit.

Another object of the present invention is that, a user can change the modeling of his spectacles by himself by the increased changeability of modeling provided by the fixing seat. Therefore, the defect of inability of changing the modeling of spectacles by the user himself as is the case of conventional accessories for spectacles can be eliminated.

A further object of the present invention is that, the fixing seat can be provided with an upright rod to fixedly mount a pattern or a letter etc.; this can increase the changeability of it in use, and the effect of usage of the spectacles can be made outstanding.

Another object of the present invention is that, the fixing seat can directly have a plane or three-dimensional ornament stuck thereon with an adhesive tape.

The present invention will be apparent in its structural features and effects as well as objects after reading the detailed description of the preferred embodiment thereof in reference to the accompanying drawings.

DETAILED DESCRIPTION OF THE PREFERRED EMBODIMENT

Figure 2:
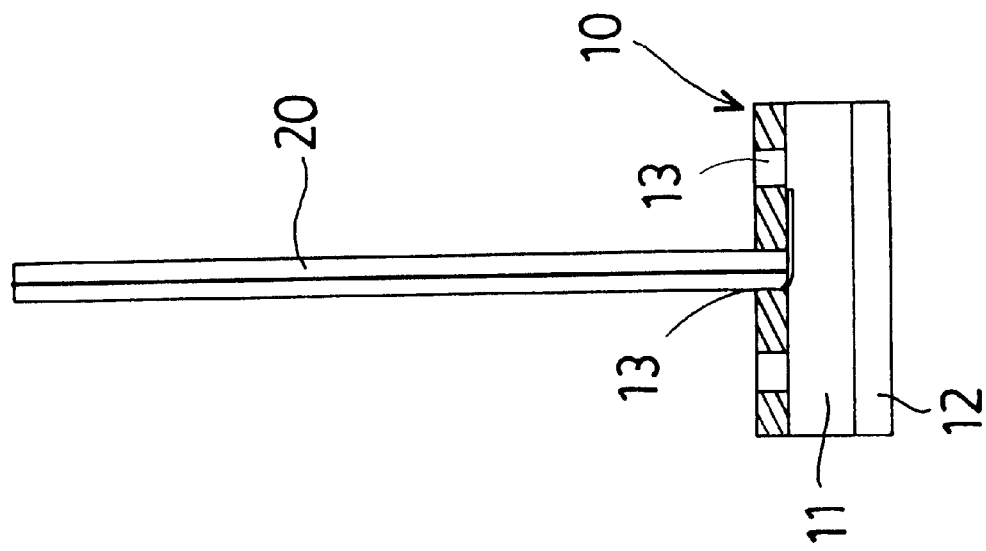
FIG. 2 is a sectional view showing use of the present invention.
Figure 1:
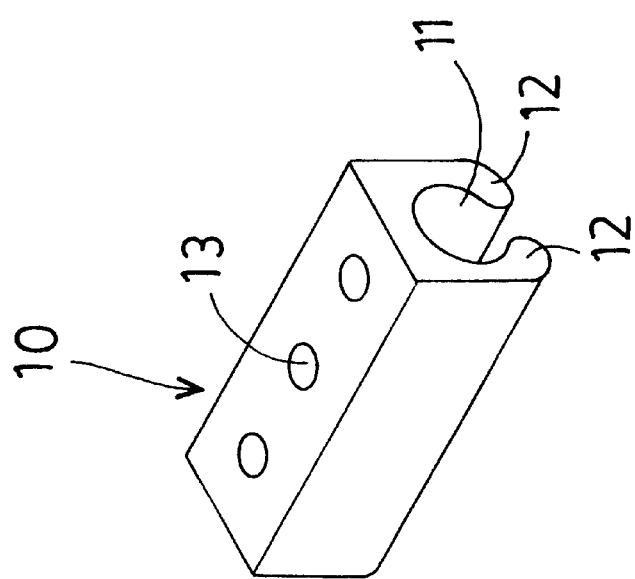
FIG. 1 is a perspective view of the present invention.

Referring firstly to FIGS. 1 and 2, a decorative fixing seat 10 of the present invention is made of tenacious plastic, the fixing seat 10 has a clamping slit 11 longitudinally extending therein and having an opening facing downwards, two rounded engaging portions 12 are provided on the two sides of the opening of the clamping slit 11. The fixing seat 10 is further provided thereon longitudinally with one or more than one holes 13 which can be or not be extended into the clamping slit 11 for mounting a flexible upright rod 20 therein.

Figure 3:
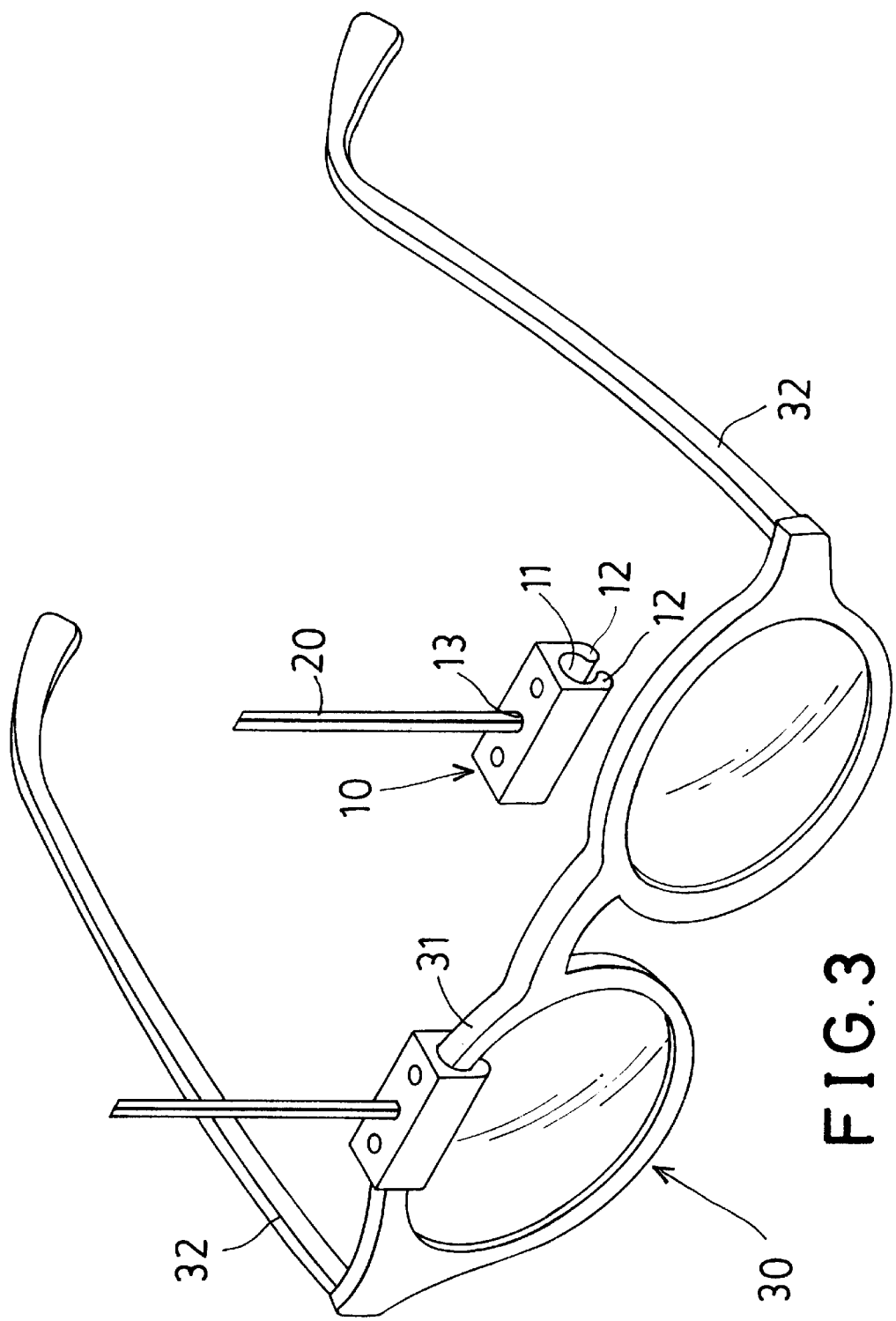
FIG. 3 is a schematic perspective view showing the present invention is fixed on a pair of spectacles.
Figure 4:
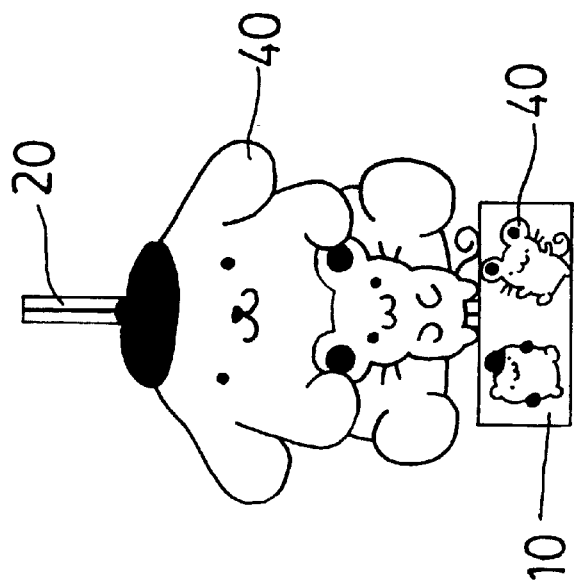
FIG. 4 is a schematic view showing an embodiment of the present invention.

Referring to FIGS. 3 and 4, two tenacious decorative fixing seats 10 are clamped on the frame 31 or the temples 32 of a pair of spectacles 30 taking advantage of clamping of the engaging portions 12 provided on the lateral sides of the opening of the clamping slits 11. The fixing seats 10 can be mounted thereon with a pattern or a letter ornament 40 in pursuance of the fondness of a user, and can directly have a plane or three-dimensional ornament 40 stuck thereon with an adhesive tape. The fixing seat 10 can be mounted thereon with the flexible upright rod 20 for fixing another ornament 40 with a larger pattern. The upright rod 20 further extending upwardly from the ornament 40 can be bent to hide behind the ornament 40.

Figure 5:
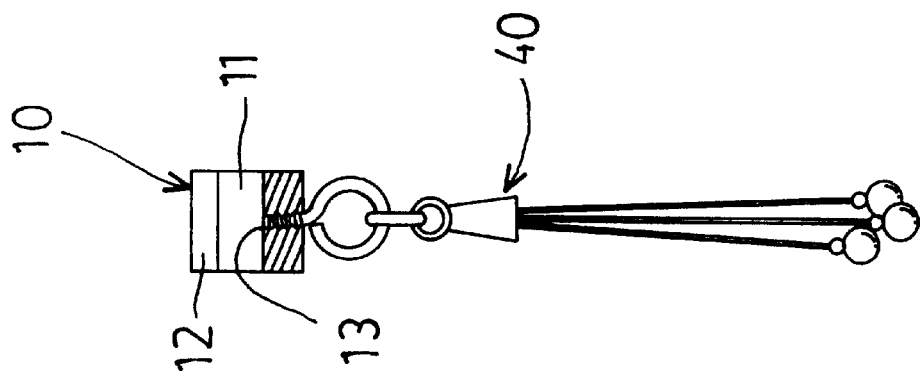
FIG. 5 is a schematic view showing another embodiment of the present invention.
Figure 6:
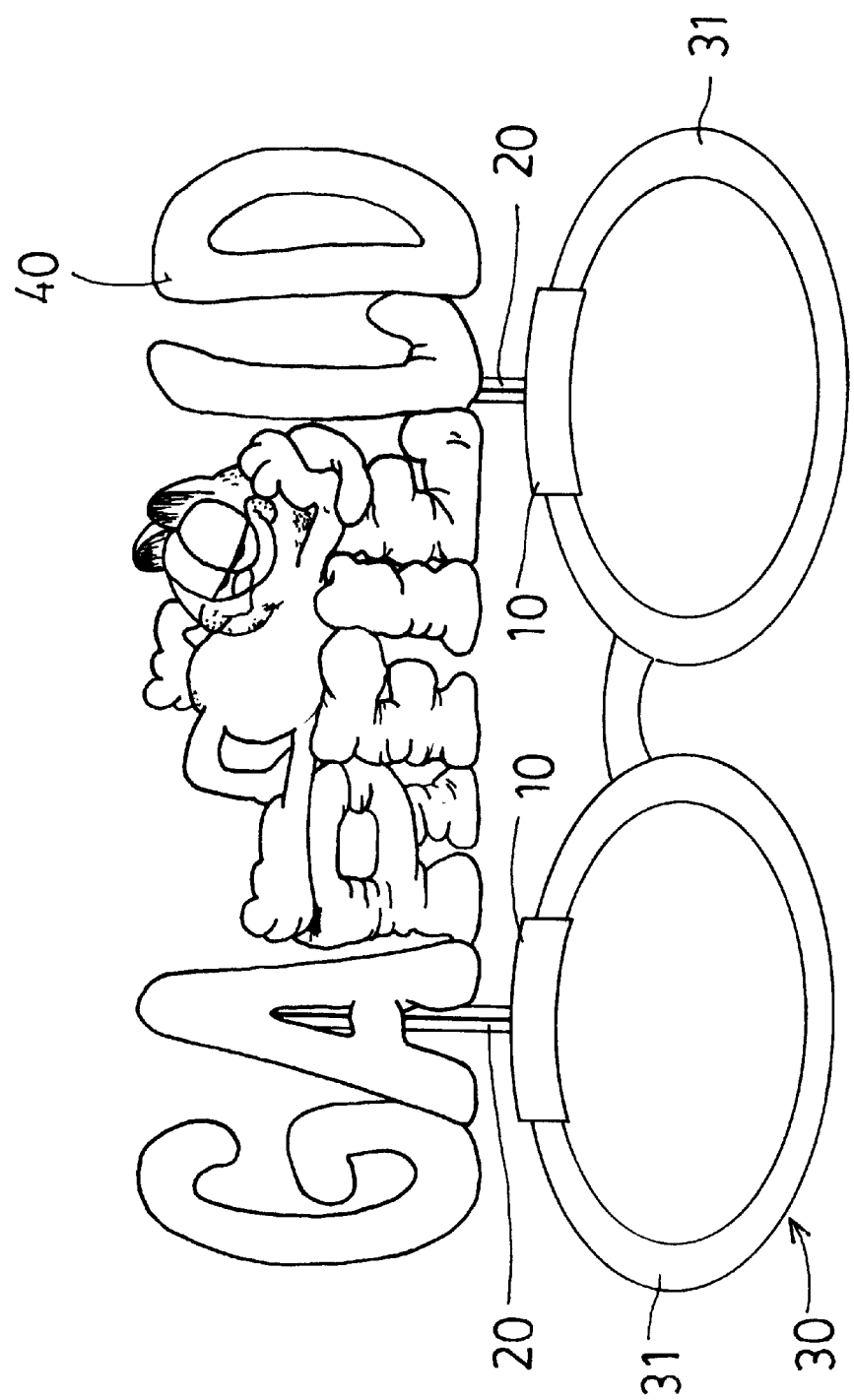
FIG. 6 is a schematic view showing a further embodiment of the present invention.

Referring to FIGS. 5 and 6, by virtue that the decorative fixing seat 10 of the present invention is made an elongate strip of tenacious plastic, it can be cut into a suitable length. The fixing seat 10 can mate the curvatures of the frame 31 and the temples 32 of the pair of spectacles 30. In addition to the flexible upright rod 20 for fixing a pattern or a letter ornament 40, the decorative fixing seat 10 is provided thereon longitudinally with one or more than one holes 13 for fixing three-dimensional ornaments 40, this can increase the changeability of it in use.

One thing worth mentioning, in addition to allowing fixing of any pattern or letter ornament 40 on the flexible upright rod 20 of the fixing seat 10 at the front side or the frame 31, the upright rod 20 can also be used to mount such an ornament 40 to increase the effect of outstanding of the spectacles 30 in use. When the decorative fixing seat 10 is fixed thereon with a three-dimensional ornament 40, and is clamped to be positioned on the frame 31 of the pair of spectacles 30, the spectacles 30 not only can look cool and dazzling, but also can increase fun by waving of the three-dimensional ornament 40.

The decorative fixing seat of the present invention can allow a user to make change at will of the arrangement and the modeling of a pattern, a letter or an advertisement figure or word or beads and a chain etc. making an ornament, to thereby get an object of completing modeling and an advertisement. Thereby, the decorative fixing seat on a pair of spectacles of the present invention is industrially practicable and novel.

The names of the members composing the present invention and the shape shown in the drawings are only for illustrating a preferred embodiment of the present invention, and not for giving any limitation to the scope of the present invention. It will be apparent to those skilled in this art that, various modifications or changes made to the elements of the present invention without departing from the spirit, scope and characteristic of this invention shall fall within the scope of the appended claims.

What is claimed is:

1. A decorative fixing seat on a pair of spectacles, said fixing seat is characterized by that:

said fixing seat is made of tenacious plastic, and has a clamping slit longitudinally extending therein and having an opening facing downwards, two engaging portions are provided on the two sides of an opening of said clamping slit; said fixing seat is adapted to being fixed thereon with a pattern, a letter or beads and a chain as an ornament, and is adapted to clamping on the frame or the temples of said pair of spectacles taking advantage of clamping of said engaging portions provided on the lateral sides of said opening of said clamping slit in order to get an object of changing modeling of said spectacles as well as advertising.

2. The decorative fixing seat as in claim 1, wherein, said fixing seats is mounted directly thereon with a plane or three-dimensional ornament stuck thereon with an adhesive tape.

3. The decorative fixing seat as in claim 1, wherein, said fixing seat is provided thereon longitudinally with one or more than one holes for mounting a flexible upright rod therein, said flexible upright rod is used for fixing an ornament.

4. The decorative fixing seat as in claim 1, wherein, said fixing seat is made an elongate strip, it is cut into a length in meeting of requirement, said fixing seat mates with the curvatures of said frame and said temples of said spectacles.

* * * * *